(12) United States Patent
Winey et al.

(10) Patent No.: US 7,759,413 B2
(45) Date of Patent: *Jul. 20, 2010

(54) DISPERSION METHOD

(75) Inventors: Karen I. Winey, Philadelphia, PA (US); Fangming Du, Upper Darby, PA (US); Reto Haggenmueller, Philadelphia, PA (US)

(73) Assignee: The Trustees Of The University Of Pennsylvania, Philadelphia, PA (US)

( * ) Notice: Subject to any disclaimer, the term of this patent is extended or adjusted under 35 U.S.C. 154(b) by 799 days.

This patent is subject to a terminal disclaimer.

(21) Appl. No.: 10/977,641

(22) Filed: Oct. 29, 2004

(65) Prior Publication Data

US 2006/0036018 A1 Feb. 16, 2006

Related U.S. Application Data

(60) Provisional application No. 60/516,526, filed on Oct. 30, 2003.

(51) Int. Cl.
*C08F 6/00* (2006.01)
*C08J 3/215* (2006.01)
*C08J 3/02* (2006.01)
*C08K 3/04* (2006.01)

(52) U.S. Cl. .................. 523/332; 523/218; 523/334; 523/512; 524/495; 524/496; 524/501; 106/236; 106/237; 106/238; 106/239; 106/271

(58) Field of Classification Search ............... 524/495, 524/496; 523/332, 218; 516/98; 252/500; 428/314.8, 314.2, 315.9, 319.3; 204/157.15; 264/488, 442; 106/23–239, 271

See application file for complete search history.

(56) References Cited

U.S. PATENT DOCUMENTS

| | | | |
|---|---|---|---|
| 6,388,046 B1 | 5/2002 | Campbell et al. | 528/198 |
| 6,465,132 B1 | 10/2002 | Jin | 429/231.8 |
| 6,544,463 B1 | 4/2003 | Luzzi et al. | 264/346 |
| 6,900,264 B2 * | 5/2005 | Kumar et al. | 524/495 |
| 6,905,667 B1 * | 6/2005 | Chen et al. | 423/447.1 |
| 2003/0089890 A1* | 5/2003 | Niu et al. | 252/500 |
| 2003/0158323 A1* | 8/2003 | Connell et al. | 524/495 |
| 2006/0036016 A1* | 2/2006 | Winey et al. | 524/495 |
| 2006/0054488 A1* | 3/2006 | Harmon et al. | 204/157.15 |

FOREIGN PATENT DOCUMENTS

WO WO 03/080513 A2 * 10/2003

OTHER PUBLICATIONS

Austin, P.J., "Gasification of silicone fluids under external thermal radiation Part I. Gasification rate and global heat of gasification," *Fire and Mater.*, 1998, 22, 221-237.
Barraza, H.J., et al., "SWNT-filled thermoplastic and elastomeric composites prepared by miniemulsion polymerization," *Nano Letts.*, 2002, 2, 797-802.
Beyer, G., "Short communication: carbon nanotubes as flame retardants for polymers," *Fire and Mater.*, 2002; 26, 291-293.
Du, F., oral slide presentation, "Single-Walled Carbon Nanotube/PMMA Composites", Annual Meeting of the American Physical Society, Austin, Texas, Mar. 6, 2003.
Fuchs, O., "Solvents and non-solvents for polymers," *The Polymer Handbook*, 3rd Ed., Brandrup, et al. (Eds.), *John Wiley & Sons*, 1989, VII-379-VII-407.
Giannelis, E.P., "Polymer layered silicate nanocomposites," *Adv. Mater.*, 1996, 8(1), 29-35.
Gilman, J.W., "Flammability and thermal stability studies of polymer layered-silicate (clay) nanocomposites," *Applied Clay Sci.*, 1999, 15, 31-49.
Gilman, J.W., et al., "Flammability properties of polymer-layered-silicate nanocomposites. Polypropylene and polystyrene nanocomposites," *Chem. Mater.*, 2000, 12, 1866-1873.
Gilman, J.W., et al., "Nanocomposites: A revolutionary new flame retardant approach," *SMAPE J.*, 1997, 33(4), 40-46.
Google Search: "Single walled nanotubes" or "single wall nanotubes" and water . . . http://www.google.com, Jul. 20, 2003, 2 pages.
Haggenmueller, R., oral slide presentation, "SWNT—Thermoplastic Composites", Annual Meeting of the American Physical Society, Seattle, Washington, Mar. 15, 2001.
Haggenmueller, R., oral slide presentation, "Nanotubes in Amorphous and Semicrystalline Polymers", Annual Meeting of the American Physical Society, Indianapolis, Indiana, Mar. 18, 2001.
Haggenmueller, R., oral slide presentation, "Fabrication and Properties of Single Walled Carbon Nanotube—Polymer Composites", University of Pennsylvania Engineering Research Symposium, Philadelphia, Pennsylvania, Feb. 20, 2003.

(Continued)

*Primary Examiner*—Vasu Jagannathan
*Assistant Examiner*—Hannah Pak
(74) *Attorney, Agent, or Firm*—Woodcock Washburn, LLP

(57) ABSTRACT

Disclosed are methods of dispersing discrete fillers in a polymer matrix to form a composite. Also disclosed are composites having discrete fillers dispersed in a polymer matrix.

5 Claims, 13 Drawing Sheets

OTHER PUBLICATIONS

Haggenmueller, R., et al., "Aligned single-wall carbon nanotubes in composites by melt processing methods," *Chem. Phys. Lett.*, 2000, 330, 219-225.

Haggenmueller, R., poster presentation, "SWNT—Thermoplastic Composites, Production and Characterization", Rice University, Houston, Texas, Jul. 9, 2001.

Haggenmueller, R., poster presentation, "Fabrication and Properties of Single Walled Carbon Nanotube—Semicrystalline Polymer Composites", Annual Meeting of the American Physical Society, Austin, Texas, Mar. 6, 2003.

Kashiwagi, T., et al., "Thermal and flammability properties of a silica-poly(methylmethacrylate) nanocomposite," *J. Appl. Poly. Sci.*, 2003, 89(8), 2072-2078.

Kashiwagi, T., et al., "Thermal degradation and flammability properties of poly(propylene)/carbon nanotube composites," *Macromol. Rapid Commun.*, 2002, 23, 761-765.

Results of search in PGPUB production database for: ("single wall nanotubes" or "single walled nanotubes") and water and DMF and precipitate http://appft1.uspto.gov, Jul. 18, 2003, 1 page.

Results of search in db for: (("single wall nanotubes" or "single walled nanotubes") and drip), http://patft.uspto.gov, Jul. 18, 2003, 1 page.

Results of search in PGPUB production database for: fibrils or nanotubes and "single wall nanotubes" or "single walled nanotubes," http://appft1.uspto.gov, Jul. 18, 2003, 2 pages.

Results of search in PGPUB production database for: "single wall nanotubes"or "single walled nanotubes" and methacrylate, http://appft1.uspto.gov, Jul. 18, 2003, 1 pages.

Results of search in PGPUB production database fro: "single wall nanotubes" or "single walled nanotubes" and DMF, http://appft1.uspto.gov. Jul. 18, 2003, 1 page.

Results of search in db for: (("single wall nanotubes" or "single walled nanotubes") and drip, http://appft1.uspto.gov, Jul. 18, 2003, 1 page.

Results of search in PGPUB production database for: "single wall nanotubes" or "single walled nanotubes" and coagulate, http://appft1.uspto.gov, Jul. 18, 2003, 1 page.

Results of search in PGPUB production database for: "single wall nanotubes" or "single walled nanotubes" and precipitate, http://appft1.uspto.gov, Jul. 18, 2003, 2 pages.

Results of search in PGPUB production database for: "single wall nanotubes" or "single walled nanotubes" and water and precipitate. http://appft1.uspto.gov, Jul. 18, 2003, 2 pages.

Results of search in db for: ((("single wall nanotubes" or "single walled nanotubes")and methacrylate) and precipitate), http://appft1.uspto.gov, Jul. 18, 2003, 1 page.

Results of search in PGPUB production database for: ("single wall nanotubes" or "single walled nanotubes") and methacrylate and drop, http://appft1.uspto.gov, Jul 18, 2003, 1 page.

Results of search in PGPUB production database for: ("single wall nanotubes" or "single walled nanotubes"), http://appft1.uspto.gov, Jul. 27, 2003, 2 pages.

Results of search in db for: ((flame retardant or "fire retardant") and ("single wall nanotubes" or "single walled nanotubes")), http://appft1.uspto.gov, Jul. 27, 2003, 1 page.

Results of search in PGPUB production database for: ("flame retardant" or "fire retardant") and methacrylate and (nanotubes or nanocomposite), http://appft1.uspto.gov, Jul. 27, 2003, 1 page.

Results of search in PGPUB production database for: nanotubes and (precipitate) and methacrylate, http://appft1.uspto.gov, Jul. 27, 2003, 1 page.

Results of search in PGPUB production database for: nanotubes and polymer and sonicator and precipitate, http://appft1.uspto.gov, Jul. 27, 2003, 1 page.

Results of search in PGPUB production database for: nanotubes and PMMA and DMF, http://appft1.uspto.gov, Jul. 27, 2003, 1 page.

Results of search in db for: ABST/"flame retardant or fire retardant" and nantubes, http://appft1.uspto.gov, Jul. 27, 2003, 1 page.

Results of search in 1976 to present db for: ("single wall nanotubes" or "single walled nanotubes"), http://patft.uspto.gov, Jul. 27, 2003, 2 pages.

Results of search in db for: (("single wall nanotubes" or "single walled nanotubes") and (fire or flame)), http://patft.uspto.gov, Jul. 27, 2003, 1 page.

Results for search in 1976 to present db for: (("single wall nanotubes" or "single walled nanotubes") and (methacrylate or DMF), http://patft.uspto.gov, Jul. 27, 2003, 1 page.

Results of search in db for: (("single wall nanotubes" or "single walled nanotubes") and (methacrylate and DMF)), http://patft.uspto.gov, Jul. 27, 2003, 1 page.

Results of search in db for: (("single wall nanotubes" or "single walled nanotubes") and retardant), http://patft.uspto.gov, Jul. 27, 2003, 1 page.

Results of search in 1976 to present db for: (nanocomposite and ("flame retardant" or "fire retardant"), http://patft.uspto.gov, Jul. 27, 2003, 2 pages.

Results of search in db for: ((nanotube and nanocomposite) and ("flame retardant" or "fire retardant")), http://patft.uspto.gov, Jul. 27, 2003, 1 page.

Results of search in 1976 to present db for: (nanotubes and ("flame retardant" or "fire retardant")), http://patft.uspto.gov. Jul. 27, 2003, 1 page.

Results of search in 1976 to present db for: ((methacrylate and nanotubes) and ("flame retardant" or "fire retardant")), http://patft.uspto.gov, Jul. 27, 2003, 1 page.

Results of search in db for: ((methacrylate and ("flame retardant" or "fire retardant")) and "single wall nanotubes" or single walled nanotubes)), http://patft.uspto.gov, Jul. 27, 2003, 1 page.

Results of search in 1976 to present db for: (("single wall nanotubes" or "single walled nanotubes") and water), http://patft.uspto.gov, Jul. 18, 2003, 2 pages.

Results of search in db for: ((nanotube and methacrylate) and (flame or fire)), http://patft.uspto.gov, Jul. 16, 2003, 1 page.

Results of search in 1976 to present db for: (fibrils and TTL/((flame or fire) and retardant)), http://patft.uspto.gov, Jul. 16, 2003, 2 pages.

Results of search in db for: ("carbon fibrils" and TTl/((flame or fire) and retardant)), http://patft.uspto.gov, Jul. 16, 2003, 1 page.

Results of search in db for: ("carbon fibril" and TTL/((flame or fire) and retardant)), http://patft.uspto.gov., Jul. 16, 2003, 1 page.

Results of search in 1976 to present db for: ((methacrylate and fibrils) and TTL/((flame or fire) and retardant)), http://patft.uspto.gov, Jul. 16, 2003, 1 page.

Winey, K.I., oral slide presentation, "Alignment and Dispersion of Single-Wall Nanotubes in Polymer Composites", Annual Meeting of the Materials Research Society, Boston, Massachusetts, Nov. 27, 2001.

Winey, K.I., oral slide presentation, "Nanotube-Polymer Composites", National Institute of Standaradns and Technology, Gaithersburg, Maryland, May 16, 2002.

Zanetti, M., et al., "Combustion behaviour of EV A/fluorohectorite nanocomposites," *Polym. Degrad. and Stability*, 2001, 74, 413-417.

Zhu, J., et al., "Fire properties of polystyrene—clay nanocomposites," *Chem. Mater.*, 2001, 13, 3774-3780.

Parker, S.P. (Ed), *McGraw-Hill Encyclopedia of Chemistry*, 2$^{nd}$ Ed., 1993, 868-870.

\* cited by examiner

SD: 4.5

DISPERSION METHOD

CROSS REFERENCE TO RELATED APPLICATIONS

This application claims the benefit of U.S. Provisional Application No. 60/516,526, filed Oct. 30, 2003, the entirety of which is incorporated by reference herein.

GOVERNMENT RIGHTS

The invention was made with U.S. Government support. The Government may have certain rights in the invention under one or more of Office of Naval Research Grants Nos. N00014-00-1-0720, R13572-41600001, and N00014-3-1-0890.

FIELD OF THE INVENTION

This invention relates to methods of dispersing discrete fillers in a polymer matrix to form a composite.

BACKGROUND OF THE INVENTION

Discrete fillers include functionalized nanotubes, discrete carbon fibers, multi-walled nanotubes, ceramic powders, metallic nanoparticles, silicates, or single-walled carbon nanotubes. Such fillers have unique mechanical, thermal, and electrical properties that would be useful in industrial applications. However, in order to be utilized in most applications, the discrete fillers must be placed in a matrix of some type to form a composite.

Certain composites have been disclosed. For example, solvent casting followed by melt mixing has been used to produce single-walled carbon nanotube/poly(methyl methacrylate) composite fibers with enhanced elastic modulus and electrical conductivity (Haggenmueller, R.; Commans, H. H.; Rinzler, A. G.; Fischer, J. E.; Winey, K. I. Chem. Phys. Lett. 2000, 330, 219). Single-walled carbon nanotube/polystyrene composite films with high electrical conductivity have been made using a miniemulsion polymerization method (Barraza H. J.; Pompano, F.; Orear, E. A.; Resasco, D. E. Nano Letters 2002, 2, 797). Likewise, multi-walled carbon nanotube/poly (propylene) composites made by shear mixing method showed a significant increase in decomposition temperature due to presence of the nanotubes (Kashiwagi, T.; Grulke, E.; Hilding, J.; Harris, R.; Awad, W.; Douglas, J. Macromol. Rapid Commun. 2002, 23, 761). However, such composites have not yet demonstrated properties approaching their theoretical potential. One of the biggest challenges faced in this area is to obtain a uniform dispersion of fillers in a polymer matrix.

Adequate dispersion is a key factor in composite performance, and discrete fillers are prone to aggregation. For example, single-walled carbon nanotubes ("SWNTs") are fullerenes in the shape of a hollow tube, usually with a diameter from 0.7-2 nm. SWNTs can be formed by a variety of conventional methods, some of which are described in U.S. Pat. No. 6,544,463, the disclosure of which is incorporated herein by reference in its entirety. SWNTs possess a unique combination of strength, high modulus of elasticity, and excellent heat and electrical conductivity, but SWNTs are prone to aggregation ("bundling") due to Van der Waals attraction among the tubes, which have large surface areas. Many previous attempts to uniformly disperse SWNTs throughout a polymer matrix have been less than fully successful.

It has now been discovered that discrete fillers, including SWNTs, may be uniformly dispersed throughout a polymer matrix to form a composite using methods of the present invention.

SUMMARY OF THE INVENTION

The present invention describes methods for producing compositions having dispersed discrete fillers. The methods comprise contacting the discrete fillers with a first fluid, combining the discrete fillers and first fluid with a polymer that is soluble in the first fluid, and thereafter precipitating the polymer, thereby entraining the discrete fillers in the polymer.

Methods are also described for producing compositions having dispersed single walled carbon nanotubes, comprising contacting single walled carbon nanotubes with a first fluid, combining the single walled carbon nanotubes and first fluid with a polymer that is soluble in the first fluid, and thereafter precipitating the polymer, thereby entraining the single walled carbon nanotubes in the polymer.

Methods are also described for producing compositions having dispersed carbon fibers, comprising contacting the carbon fibers with a first fluid, combining the carbon fibers and first fluid with a polymer that is soluble in the first fluid, and thereafter precipitating the polymer, thereby entraining the carbon fibers in the polymer.

Methods are also described for producing a composition having dispersed single walled carbon nanotubes wherein the polymers are not readily soluble in liquids at room temperature. These methods include contacting the single walled carbon nanotubes with a first fluid; combining the single walled carbon nanotubes and first fluid with a polymer that is soluble in the first fluid at a temperature greater than room temperature; cooling the polymer; and entraining the single walled carbon nanotubes with the polymer.

DETAILED DESCRIPTION

Figure 1:
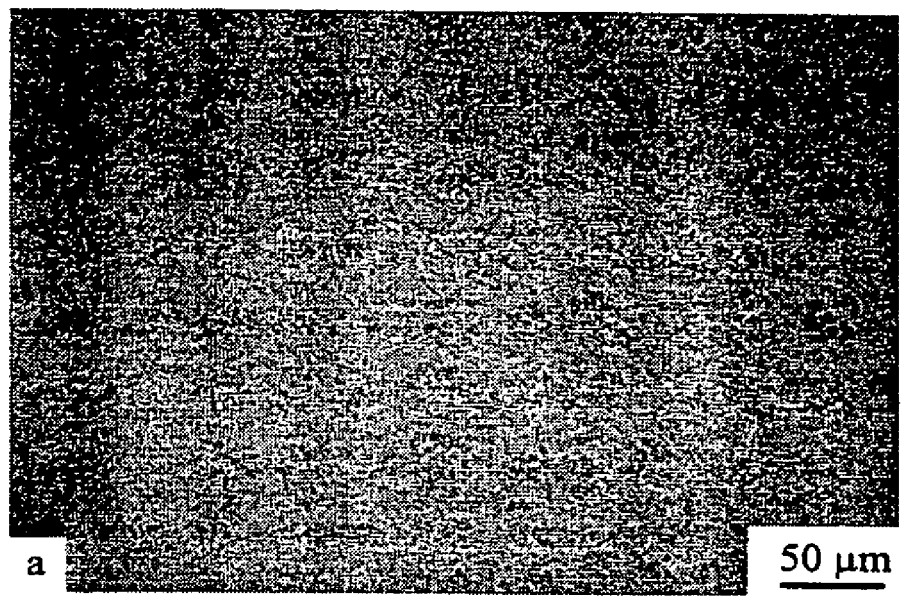
FIG. 1 is an optical micrograph of a composite according to the present invention.

The present invention relates to methods of dispersing discrete fillers in a matrix to form a composite. For example, in one embodiment, a method for producing a composition having dispersed discrete fillers is described, comprising contacting the discrete fillers with a first fluid, combining the discrete fillers and first fluid with a polymer that is soluble in the first fluid, and thereafter precipitating the polymer from the fluid, entraining the discrete fillers with the polymer.

Suitable discrete fillers inlcude functionalized nanotubes, discrete carbon fibers, multi-walled nanotubes, ceramic powders, metallic nanoparticles, silicates, single-walled carbon nanotubes, and any combination thereof. The composition preferably contains discrete fillers in a weight fraction to the composition in a range from about 0.001% to about 20%, the amounts used depending on the desired properties of the composite. More preferably, the composition preferably contains discrete fillers in a weight fraction to the composition in a range from about 0.1% to about 10%. More preferably, the composition preferably contains discrete fillers in a weight fraction to the composition in a range from about 0.5% to about 5%. More preferably, the composition preferably contains discrete fillers in a weight fraction to the composition in a range from about 1% to about 2%. More preferably still, the discrete fillers are present in a concentration of about 1% by weight of the composition.

The filler is suitably dispersed in the first fluid, for example, by sonication.

Suitably, the first fluid is any organic or aqueous fluid capable of providing a dispersion of discrete fillers. Typically, the first fluid is at least one of dimethylformamide ("DMF"), toluene, acetone, methanol, ethanol, methyl ethyl ketone, xylene, or water. Preferably, the first fluid is DMF.

Suitable polymers include at least one of poly(methyl methacrylate) ("PMMA"), poly(olefins), poly(imides), poly(amides), poly(dienes), poly(acetylenes), poly(alkenes), poly(acrylics), poly(methacrylics), poly(vinyl ethers), poly(vinyl alcohols), poly(acetals), poly(vinyl ketones), poly(vinyl halides), poly(vinyl nitrites), or poly(styrenes). Preferably, the polymer is PMMA. PMMA is available from Polysciences Inc., Warrington, Pa., with an average molecular weight of 100,000. PMMA is soluble in DMF.

Preferably, the step of precipitating the polymer includes contacting the mixture of discrete filler, first fluid, and polymer with a second fluid, wherein the polymer is not soluble in the second fluid. All means of contacting the mixture with the second fluid are contemplated, for example, the mixture may be added drop-wise into the second fluid or all at once.

Peferably, the volume of the first fluid is in a ratio of about 1:5 with the second fluid.

The second fluid is at least one of dimethylformamide ("DMF"), toluene, acetone, methanol, ethanol, methyl ethyl ketone, xylene, or water. When the first fluid is DMF, and the polymer is PMMA, preferably, the second fluid is distilled water.

Selection of the discreet filler typically will depend on desired properties known to be associated with each individual filler. Selection of the first fluid, polymer, and second fluid typically will be guided by three principles: 1) the polymer should be substantially soluble in the first fluid; 2) the polymer should be substantially insoluble in the second fluid; and 3) the first fluid should be substantially miscible with the second fluid. The solubilities and miscibilities of the foregoing fluids and polymers are well known to those of skill in the art.

Due to its insolubility in the second fluid, the polymer typically will coagulate and precipitate, thereby entraining the discrete filler in the polymer. This prevents the filler from aggregating. The precipitated filler composite can be filtered and dried, and then manipulated by conventional means, such as a hot press, to form a desired shape, for example, fibers or films.

In another embodiment, the present invention provides a method for producing a composition having dispersed single walled carbon nanotubes ("SWNTs"), comprising contacting the SWNTs with a first fluid, combining the SWNTs and first fluid with a polymer that is soluble in the first fluid, and thereafter precipitating the polymer from the fluid, entraining the SWNTs with the polymer.

SWNTs can be prepared by several well known methods, including the HiPco method, and are commercially available as well. Due to manufacturing conditions, SWNTs routinely have a residual metal content that varies in a range from about 1 wt % to about 50 wt %. These impurities can be reduced by various conventional purification methods if desired. It has been found that the purified SWNTs are best stored in some type of solvent, as opposed to being completely dried. If the purified SWNTs are completely dried before dispersion they typically will irreversibly aggregate. If the solvent used to store the purified SWNTs is other than the first fluid, the solvent may be partially or substantially replaced by the first fluid.

The composition preferably contains SWNTs in a weight fraction to the composition in a range from about 0.001% to about 20%. More preferably, the composition preferably contains SWNTs in a weight fraction to the composition in a range from about 0.1% to about 10%. More preferably, the composition preferably contains SWNTs in a weight fraction to the composition in a range from about 0.5% to about 5%. More preferably, the composition preferably contains SWNTs in a weight fraction to the composition in a range from about 1% to about 2%. More preferably still, the SWNTs are present in a concentration of about 1% by weight of the composition.

The first fluid is at least one of dimethylformamide ("DMF"), toluene, acetone, methanol, ethanol, methyl ethyl ketone, xylene, or water. Preferably, the first fluid is DMF. After the SWNTs are placed in the first fluid, they are dispersed, for example by sonication.

The polymer is at least one of poly(methyl methacrylate) ("PMMA"), poly(olefins), poly(imides), poly(amides), poly(dienes), poly(acetylenes), poly(alkenes), poly(acrylics), poly(methacrylics), poly(vinyl ethers), poly(vinyl alcohols), poly(acetals), poly(vinyl ketones), poly(vinyl halides), poly(vinyl nitrites), or poly(styrenes). Preferably, the polymer is PMMA.

In one embodiment of the method, the step of precipitating the polymer is achieved by contacting the SWNT/PMMA/DMF mixture with a second fluid, wherein the polymer is not soluble in the second fluid.

Preferably, the volume of the first fluid is in a ratio of about 1:5 with the second fluid. The second fluid is at least one of dimethylformamide ("DMF"), toluene, acetone, methanol, ethanol, methyl ethyl ketone, xylene, or water. When the first fluid is DMF, and the polymer is PMMA, preferably, the second fluid is distilled water. Selection of the first fluid, polymer, and second fluid typically will be guided by three principles: 1) the polymer should be substantially soluble in the first fluid; 2) the polymer should be substantially insoluble in the second fluid; and 3) the first fluid should be substantially miscible with the second fluid. The solubilities and miscibilities of the foregoing fluids and polymers are well known to those of skill in the art. All means of contacting the SWNT/PMMA/DMF mixture with the second fluid are contemplated, for example, the mixture may be added drop-wise into the second fluid or all at once.

Due to its insolubility in the second fluid, the polymer typically will coagulate and precipitate, thereby entraining the SWNTs in the polymer. This prevents the SWNTs from bundling again. The precipitated SWNT composite can be filtered and dried, and then manipulated by conventional means, such as a hot press, to form a desired shape, for example, fibers or films.

In another embodiment, the present invention provides a method for producing a composition having dispersed carbon fibers, comprising contacting the carbon fibers with a first fluid; combining the carbon fibers and first fluid with a polymer that is soluble in the first fluid, and thereafter precipitating the polymer from the fluid, entraining the carbon fibers with the polymer.

Carbon fibers are commercially available. The composition preferably contains carbon fibers in a weight fraction to the composition in a range from about 0.001% to about 20. More preferably, the composition preferably contains carbon fibers in a weight fraction to the composition in a range from about 0.1% to about 10%. More preferably, the composition preferably contains carbon fibers in a weight fraction to the composition in a range from about 0.5% to about 5%. More preferably, the composition preferably contains carbon fibers in a weight fraction to the composition in a range from about 1% to about 2%. More preferably still, the carbon fibers are present in a concentration of about 1% by weight of the composition.

The first fluid is at least one of dimethylformamide ("DMF"), toluene, acetone, methanol, ethanol, methyl ethyl ketone, xylene, or water. Preferably, the first fluid is DMF. After the carbon fibers are placed in the first fluid, they are dispersed, for example by sonication.

The polymer is at least one of poly(methyl methacrylate) ("PMMA"), poly(olefins), poly(imides), poly(amides), poly(dienes), poly(acetylenes), poly(alkenes), poly(acrylics), poly(methacrylics), poly(vinyl ethers), poly(vinyl alcohols), poly(acetals), poly(vinyl ketones), poly(vinyl halides), poly(vinyl nitrites), or poly(styrenes). Preferably, the polymer is PMMA.

In one embodiment of the method, the step of precipitating the polymer is achieved by contacting the carbon fiber/PMMA/DMF mixture with a second fluid, wherein the polymer is not soluble in the second fluid.

Preferably, the volume of the first fluid is in a ratio of about 1:5 with the second fluid. The second fluid is at least one of dimethylformamide ("DMF"), toluene, acetone, methanol, ethanol, methyl ethyl ketone, xylene, or water. When the first fluid is DMF, and the polymer is PMMA, preferably, the second fluid is distilled water. Selection of the first fluid, polymer, and second fluid typically will be guided by three principles: 1) the polymer should be substantially soluble in the first fluid; 2) the polymer should be substantially insoluble in the second fluid; and 3) the first fluid should be substantially miscible with the second fluid. The solubilities and miscibilities of the foregoing fluids and polymers are well known to those of skill in the art. All means of contacting the carbon fiber/PMMA/DMF mixture with the second fluid are contemplated, for example, the mixture may be added drop-wise into the second fluid or all at once.

Due to its insolubility in the second fluid, the polymer typically will coagulate and precipitate, thereby entraining the carbon fibers in the polymer. This prevents the carbon fibers from bundling again. The precipitated carbon fiber composite can be filtered and dried, and then manipulated by conventional means, such as a hot press, to form a desired shape, for example, fibers or films.

In certain embodiments, polymers are readily dissolved in solvents at elevated temperatures, combined with nanotubes, and then the temperatures are reduced (herein referred to as "the hot coagulation method"). This is particularly useful for certain important commodity thermoplastics that have good solvent resistance at room temperature, e.g., polyethylene. The SWNTs can be integrated a polymer solution at elevated temperature to obtain a composite. The incorporation in solution provides an effective method to add different SWNT loadings and to insert the SWNTs in a suspended state. Polymeric crystals are subsequently grown from the cooled solution in the presence of the SWNTs, resulting in the composite. The hot-coagulation is applicable to polymers that are not soluble in any solvent at the required temperature for the sonication and mixing with SWNTs, as necessary for the regular coagulation method. The hot coagulation method does not necessarily require the use of a non-solvent to precipitate the dissolved polymer, although one ore more non-solvents may be used.

Many non-crosslinked polymers are readily dissolved in a solvent at or close to room temperature ("RT"). Polymers that are not RT soluble include, but are not limited to, poly(tetrafluor-ethylene) (PTFE) and the acid polymer poly(ethylene-methacrylic acid) (Nucrel). PTFE can be dissolved in perfluorokerosene at 350° C.; Nucrel is soluble in TCB above 130° C. A wide variety of polymers and their solvents are known to those of skill in the art, for example, by referring to "The Polymer Handbook", Brandrup and Immergut, $3^{rd}$. Ed., Wile Interscience, 1989. Solvents that dissolve the polymer and suspend the nanotubes can be used for the hot-coagulation. This could be solvents like xylene, dichlorobenzene, other hydrocarbons, halogenated hydrocarbons, higher aliphatic esters and ketones.

Functionalization of the SWNTs can improve the suspension in these solvents. Lower SWNT concentrations for the suspension reduce the agglomerate formation and could result in a better dispersion. For example, 0.1 mg/ml is typical, and 0.05 mg/ml SWNT in TCB is preferred. Higher concentrations, however typically lead to numerous agglomerates.

Useful temperatures depend on the solubility of the polymers and the capability of the ultrasonic bath. 97° C. is the maximum useful temperature for most water bath heated processes. Higher boiling liquids could be used to extend the application of the ultrasonic bath. Tip-sonicators can also be used, which can be immersed into the SWNT-polymer mixture at a wider range of temperatures compared to water bath heated sonicators. Typically, the time at which the SWNT-polyethylene mixture is sonicated before cool-down and the cooling rate is varied to control the crystallite growth of semicrystalline polymers.

The present invention is further described in the following examples.

EXAMPLES

Example 1

Production of SWNT Composites

Single-walled carbon nanotubes for the composites were produced by the HiPco method. The metal content of the SWNTs was about 8 wt % determined by thermal gravimetric analysis (TGA) using a TA Instruments SDT 2960 at 5°

C./min in air. Factors such as residual metal content, length, and alignment in the composite all affect the performance properties of the composite, depending on the intended use.

PMMA (poly(methyl methacrylate)) was procured from Polysciences Inc., Warrington, Pa., with an average molecular weight of 100,000.

SWNTs and PMMA were combined in DMF in the amounts necessary to form the desired weight percentage ("wt %"). For example to produce 1 wt % SWNT composite, 60 mg SWNTs and 5.94 g PMMA were added to 240 ml dimethylformamide (DMF). The mixture was then sonicated for 24 hours to obtain a good dispersion of SWNTs in the solvent. The homogeneous suspension was then dripped into a large amount of distilled water ($V_{DMF}:V_{water}=1.5$) in a blender. The PMMA precipitated immediately due to its insolubility in water. The precipitation of PMMA entrapped the SWNTs and prevented SWNTs from bundling again. After filtration and drying under vacuum at 120° for 24 hours, the 1 wt % SWNT composite was obtained.

Pure PMMA polymer samples were also produced by the same method, but omitting the SWNTs.

Example 2

Alignment

To produce composites where the SWNTs were aligned along a common axis, fibers were made by melt spinning composites from Example 1 with a single spinner hole having a 0.50 mm diameter. The extruded fibers were air cooled and drawn onto a spool. The diameter of the fibers varied from 30 µm to 50 µm. A heat gun was used to weld the fibers together while on the spool. The welded fibers were hot pressed in a channel die at 1000 lbs/in and 160° C. for approximately 3 minutes, producing a 2 mm×2 mm×10 mm aligned composite. Due to high viscosity, composites with greater than 2 wt % SWNT were not melt spun. Theoretically, other methods of producing flow could be used to partially align the SWNTs at higher concentrations.

Example 3

Characterization of Dispersion

The method of Example 1 was used to produce a 1 wt % SWNT composite. A hot press was used to prepare a film of ~30 µm thickness which was observed with an optical microscope to determine SWNT dispersion. As shown in the optical micrograph in FIG. 1, there was no bundling or coagulation of SWNTs in the composite.

Figure 2:
FIG. 2 is a scanning electron micrograph of a composite according to the present invention.

The method of Example 1 was used to produce a 7 wt % SWNT composite. The fracture surface was observed with a scanning electron microscope ("SEM"; JEOL 6300FV at 5 kV voltage) to determine SWNT dispersion. As shown in the SEM micrograph in FIG. 2, there was no bundling or coagulation of SWNTs in the composite.

Figure 3:
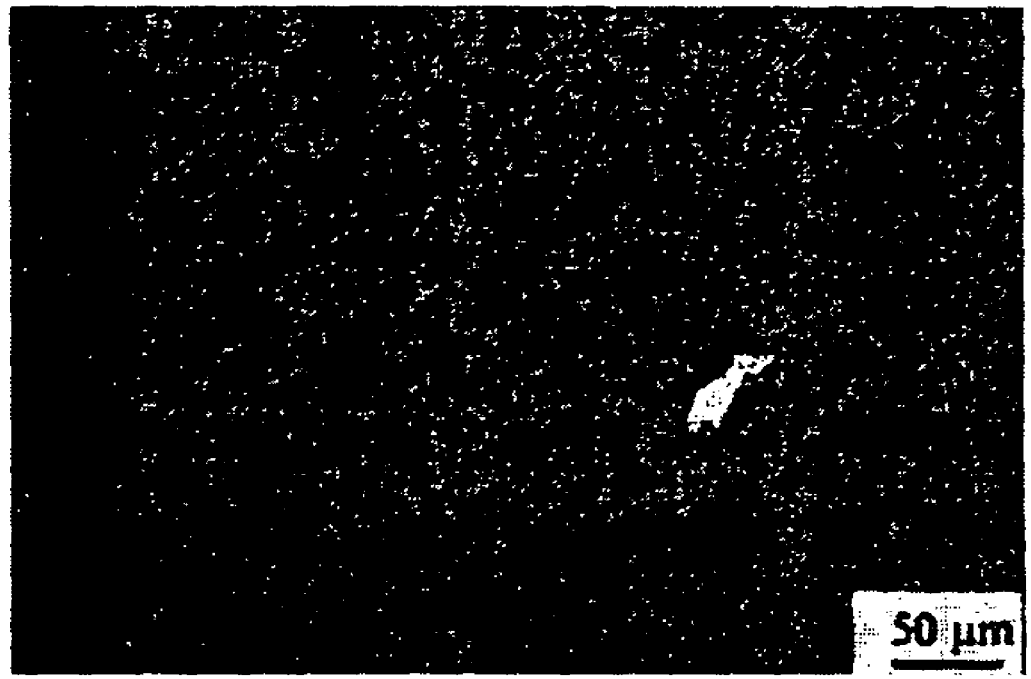
FIG. 3 is an optical micrograph of a composite.

If purification is undertaken, and if the purified SWNTs are completely dried before dispersion they typically will irreversibly aggregate, as shown in FIG. 3, where a 1 wt % SWNT composite made with completely dried purified SWNTs was made and observed with an optical microscope. Thus, purified SWNTs are best stored in some type of solvent, as opposed to being completely dried.

Figure 4:
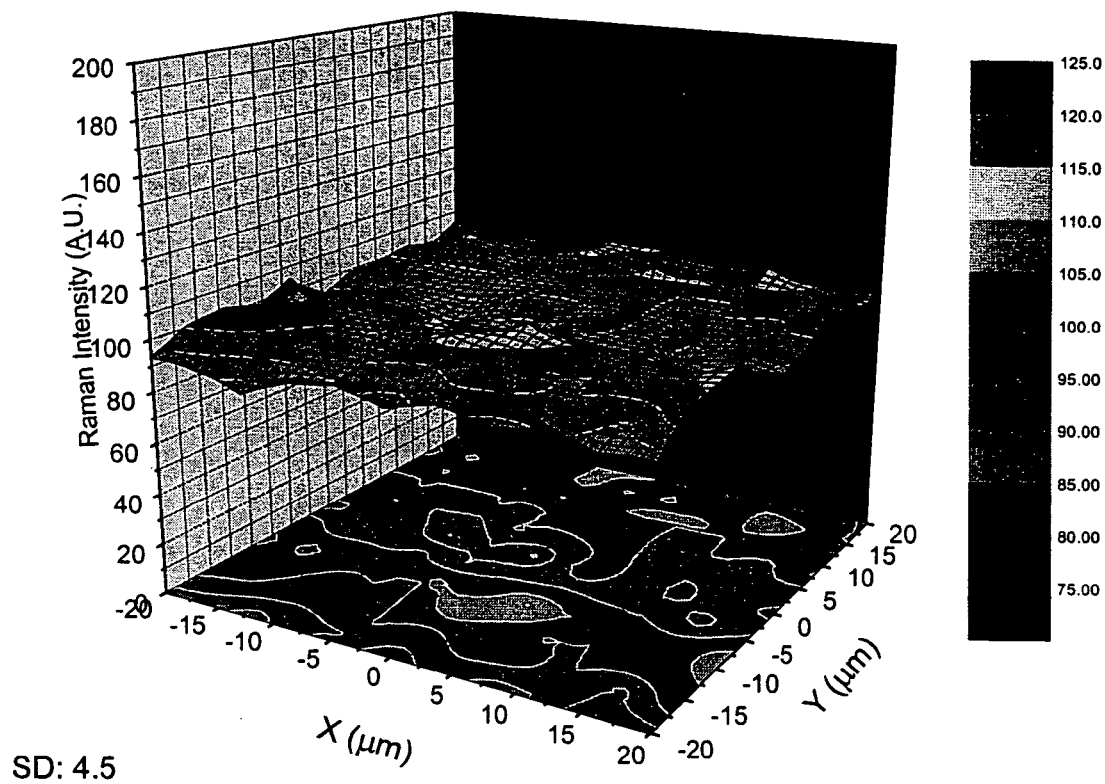
FIG. 4 is a graph of Raman intensity for a composite according to the present invention.

FIG. 4 is a Raman image of a 1 wt % SWNT/PMMA film sample with a standard deviation of 4.5, indicating a good dispersion of SWNTs in the polymer matrix. Raman intensity map can be created by performing 2D point-by-point Raman scan. In principle, the Raman intensity should be proportional to the total number of SWNTs in the sampling volume, thus the intensity map is equivalent to the SWNT distribution map within the surface layer of the sample. Using a Renishaw Ramanscope 1000 system equipped with 514.5 nm, 633 nm and 780 nm laser sources with an auto-focusing feature, the spatial resolution was tuned to one micron. The Raman image of a SWNT/PMMA composite film using 514.5 nm laser excitation was shown in FIG. 4, with a scanning area of 40 µm×40 µm (laser spot size and step size are both 1 um). Integrated intensities of Raman G band (from 1450 $cm^{-1}$ to 1650 $cm^{-1}$) on the baseline were used to create the Raman map. The intensities were further normalized to an average of 100 (A.U.) and the standard deviation (SD) of the intensities was calculated to quantitatively describe the degree of the homogeneity of SWNT dispersion in the polymer matrix. Ten Raman maps collected from the same PMMA composite sample at different regions produce similar standard deviations within an error bar of ±10%.

Example 4

Properties of Unaligned Composites

The method of Example 1 was used to produce unaligned SWNT/PMMA composites in the weight percentages listed in TABLE 1. Pure PMMA polymer samples (0.0 SWNT wt %) were also produced by the same method, but without adding SWNTs.

Each SWNT/PMMA composite precipitate was hot pressed in a channel die at 1000 lbs/in and 160° C. for approximately 3 minutes, producing a 2 mm×2 mm×10 mm sample.

Electrical conductivity was measured using either the conventional four-probe or conventional two-probe method at room temperature, the latter being used for electrical conductivities less than $10^{-8}$ S/cm.

Thermal stability was determined by thermal gravimetric analysis (TGA) using a TA Instruments SDT 2960 at 5° C./min in air from 25° C. to 800° C. in air. All samples were ~2.0 $mm^3$. TABLE 1 reports the temperature of the maximum rate of mass loss.

TABLE 1

| SWNT wt % | Electrical Conductivity (S/cm) | Thermal Stability (° C.) |
|---|---|---|
| 0.0 | $10^{-15}$ (theoretical value) | 311 |
| 0.1 | $<10^{-12}$ | 362 |
| 0.5 | $<10^{-12}$ | 371 |
| 1 | $~10^{-11}$ | 372 |
| 2 | $5 \times 10^{-5}$ | 372 |
| 5 | $1.4 \times 10^{-4}$ | 373 |
| 7 | $2.6 \times 10^{-4}$ | 373 |

Figure 5:
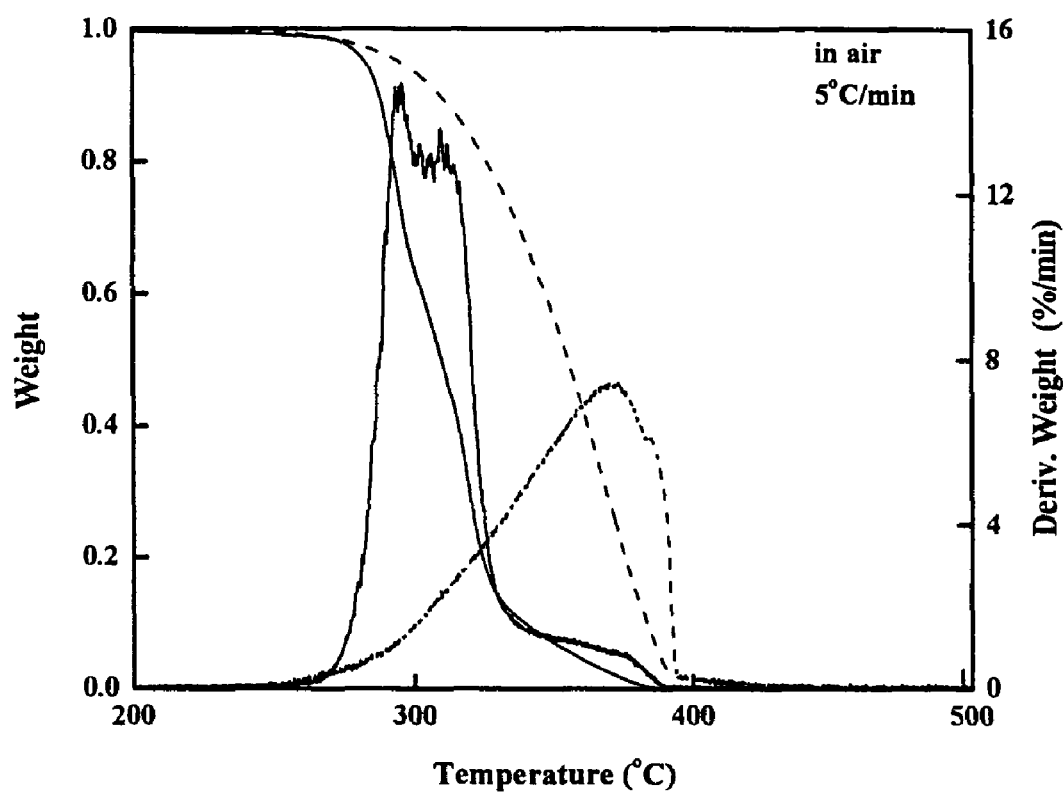
FIG. 5 is a graph showing mass loss rate curves for a standard and a composite according to the present invention.

A comparison of the mass loss rate curves between the pure PMMA polymer sample and the 0.5 wt % SWNT composite is shown in FIG. 5. The results show that the samples begin to lose weight at the same temperature, but the maximum rate of mass loss is only ~7.8%/min for the 0.5 wt % SWNT composite (dashed line), as compared to 14.5%/min for the pure PMMA polymer sample (solid line). Also, the temperature at the maximum rate of mass loss for the composite was 372° C., approximately 61° C. higher than the pure PMMA polymer sample.

Example 5

Properties of Aligned Composites

The methods of Examples 1 and 2 were used to produce aligned SWNT/PMMA composites ("aligned composites") in the weight percentages listed in TABLE 2. Pure PMMA polymer samples (0.0 SWNT wt %) were also produced by the same method, but without adding SWNTs.

Electrical conductivity was measured using either the conventional four-probe or conventional two-probe method at room temperature, the latter being used for electrical conductivities less than $10^{-8}$ S/cm. Electrical conductivity was measured along the length of the fiber (and presumably lengthwise for the SWNTs).

Elastic modulus was tested in tension on an Instron 4206 with a 0.5 N load cell. The fibers were fixed on a testing tab with a gauge length of 25.4 mm and tested at room temperature with a deformation rate of 1 nm/min.

Figure 6:
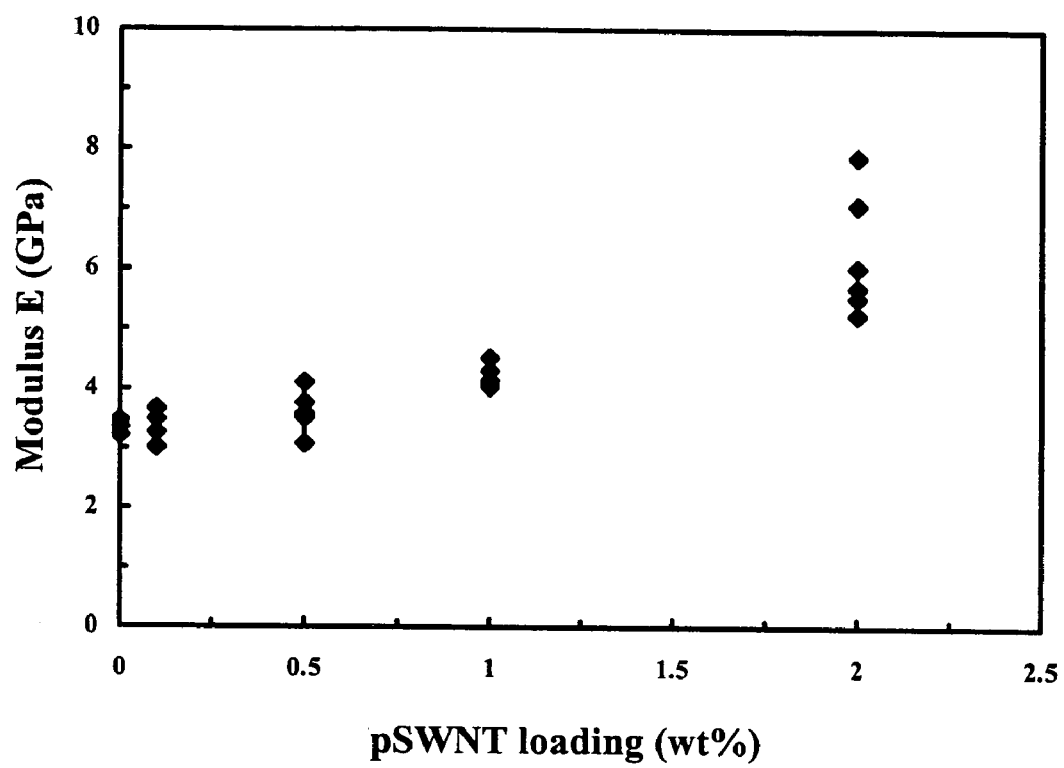
FIG. 6 is a graph showing elastic modulus for composites of the present invention.

The elastic modulus increases with increasing SWNT concentration, as shown in FIG. 6. In fact, the elastic modulus for the 2 wt % SWNT composite was approximately 90% higher than the pure PMMA fibers.

Figure 7:
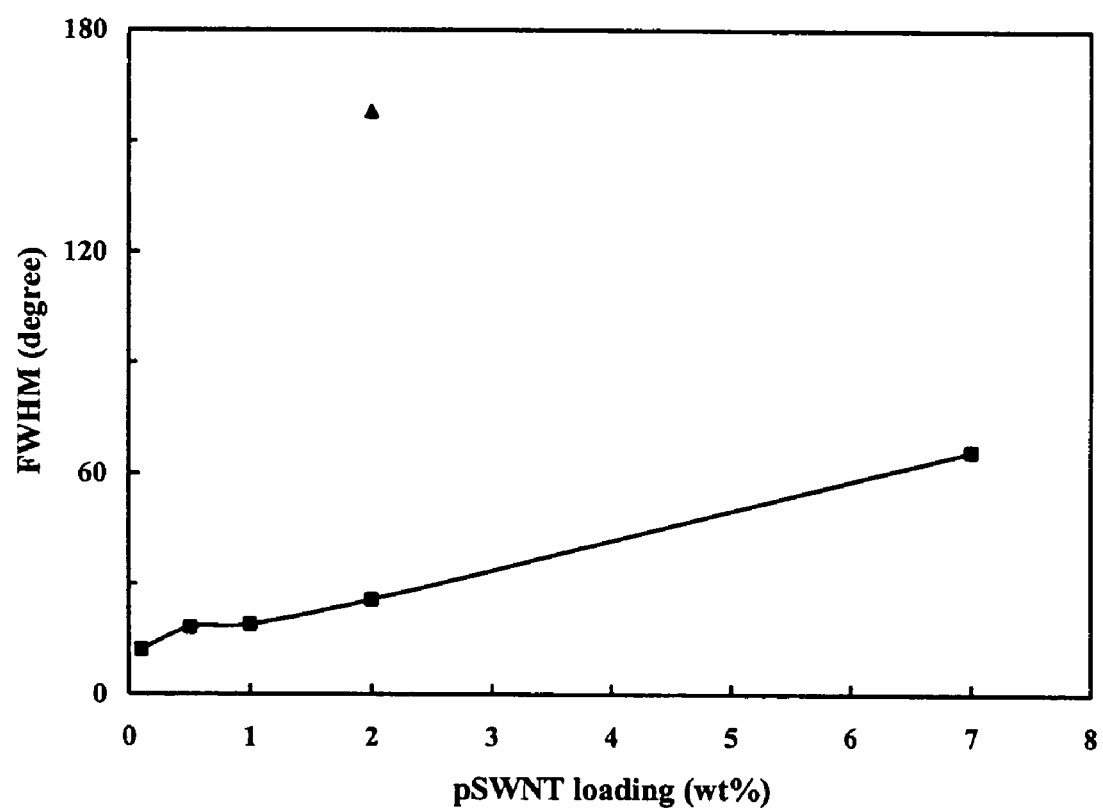
FIG. 7 is a graph showing SAXS intensity for composites of the present invention.

An X-ray fiber diagram was used to characterize the alignment of SWNT within the aligned composites. Results obtained from small angle X-ray scattering ("SAXS") was performed in transmission on the University of Pennsylvania's multi-angle diffractometer equipped with a 2-D wire detector. From the 2D data sets, the results were integrated along a radial Q direction (e.g., 0.02<Q<0.05) and plotted the intensity versus azimuthal angle. The data was fitted by Lorentzian function whose full width at half maximum ("FWHM") quantitatively describes the degree of SWNT alignment in the composite. Results are shown in FIG. 7. The 1 wt % aligned SWNT composite (square symbol) had good alignment (approximately 18°), and FWHM increased with increasing SWNT concentration, presumably due to steric constraints. The FWHM of the 2 wt % unaligned SWNT composite (triangle symbol) was approximately 160°, showing a nearly random orientation of SWNT in the polymer matrix.

Figure 8:
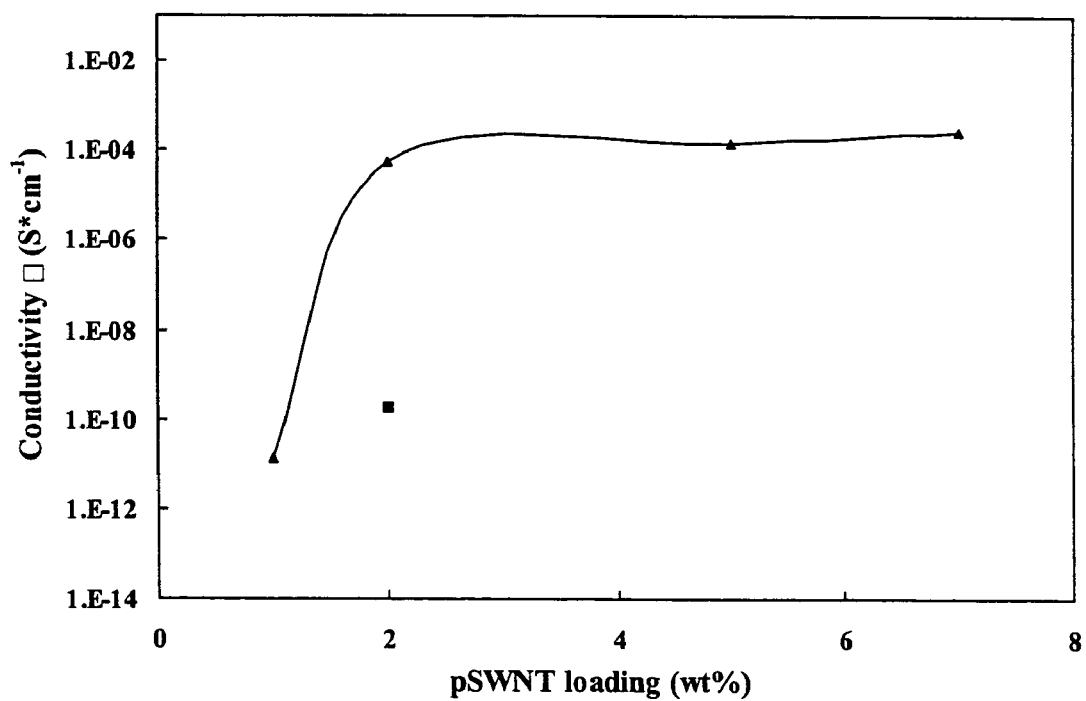
FIG. 8 is a graph showing electrical conductivity for composites of the present invention.

FIG. 8 compares electrical conductivity of aligned composites (square symbol) and unaligned composites (triangle symbol). It is believed that alignment allows fewer contact points between the SWNTs when they are highly aligned.

TABLE 2

| SWNT wt % | Electrical Conductivity (S/cm) | Elastic Modulus (GPa) |
| --- | --- | --- |
| 0.0 | $10^{-15}$ (theoretical value) | 3.3 |
| 0.1 | — | 3.3 |
| 0.5 | — | 3.6 |
| 1 | — | 4.2 |
| 2 | $\sim 10^{-10}$ | 6.3 |

The elastic modulus increases with increasing SWNT concentration, as shown in FIG. 6. In fact, the elastic modulus for the 2 wt % SWNT composite was approximately 90% higher than the pure PMMA fibers.

An X-ray fiber diagram was used to characterize the alignment of SWNT within the aligned composites. Small angle X-ray scattering ("SAXS") was performed in transmission on the University of Pennsylvania's multi-angle diffractometer equipped with a 2-D wire detector. From the 2D data sets, the results were integrated along a radial Q direction (e.g., 0.02<Q<0.05) and plotted the intensity versus azimuthal angle. The data was fitted by Lorentzian function whose full width at half maximum ("FWHM") quantitatively describes the degree of SWNT alignment in the composite. Results are shown in FIG. 7. The 1 wt % aligned SWNT composite (square symbol) had good alignment (approximately 18°), and FWHM increased with increasing SWNT concentration, presumably due to steric constraints. The FWHM of the 2 wt % unaligned SWNT composite (triangle symbol) was approximately 160°, showing a nearly random orientation of SWNT in the polymer matrix.

FIG. 8 compares electrical conductivity of aligned composites (square symbol) and unaligned composites (triangle symbol). It is believed that alignment allows fewer contact points between the SWNTs when they are highly aligned.

Example 6

Carbon Fiber Composite

Figure 9:
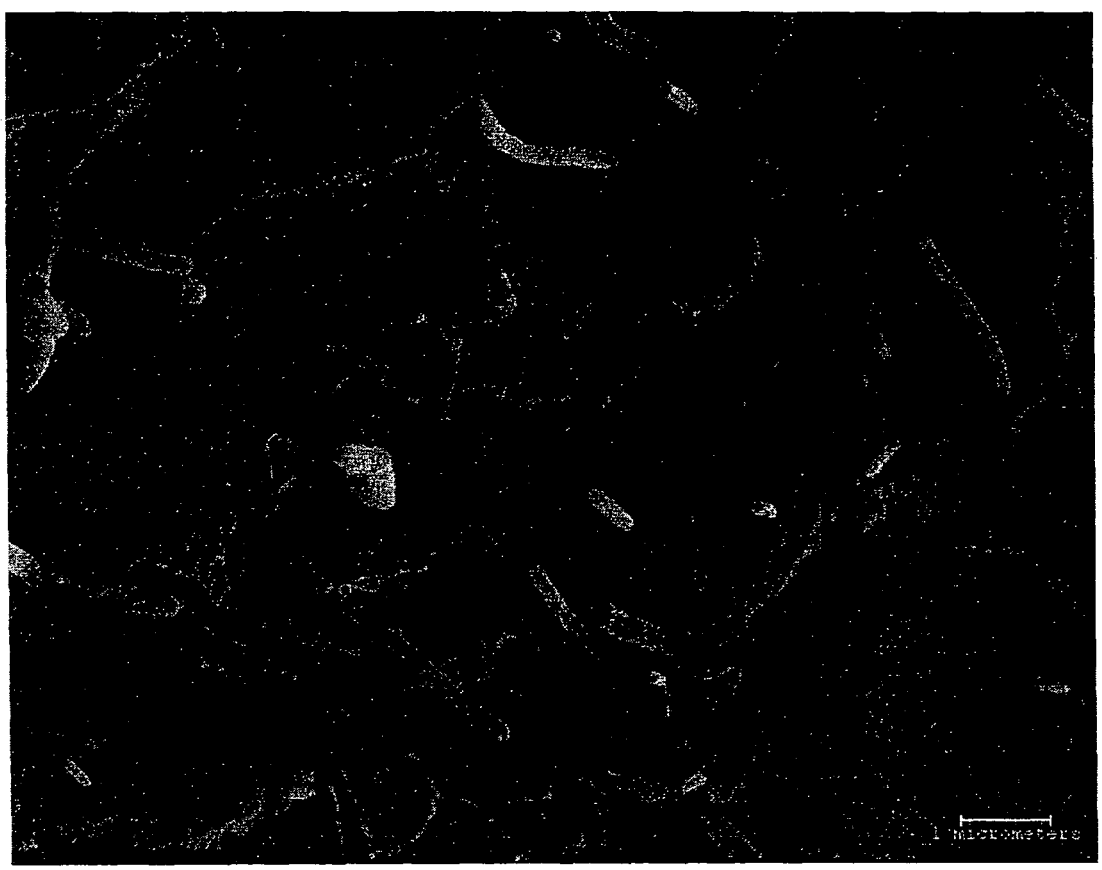
FIG. 9 is a scanning electron micrograph of another composite according to the present invention.

The method of Example 1 (except that SWNTs were replaced with carbon fiber) was used to produce a 5% carbon fiber/PMMA composite. The fracture surface was observed with a scanning electron microscope ("SEM"; JEOL 6300FV at 5 kV voltage) to determine carbon fiber dispersion. As shown in the SEM micrograph in FIG. 9, there was no aggregation of carbon fiber in the composite.

Example 7

Hot-Coagulation of Polyethylene—SWNT Composites

Polyethylene (PE) is an important commodity thermoplastic with a good solvent resistance at room temperature. This means that the SWNTs have to be integrated either in the PE melt or in a PE solution at elevated temperature to obtain a composite. The incorporation in solution provides an effective method to add different SWNT loadings and to insert the SWNTs in a suspended state. The PE crystals can be grown from the solution in the presence of the SWNTs, resulting in the composite.

Materials and Methods

SWNTs used for the composites were purified HiPco (CNI) and purified laser-ablated SWNTs (NASA). The SWNTs were suspended in 1,2,4-trichlorobenzene (TCB). Two PE with different crystallinities and different melting temperatures were used. The high-density polyethylene (HDPE) has a crystallinity of 78% and a melting temperature of 131° C.; the low-density polyethylene (LDPE) has a crystallinity of 33% and a melting temperature of 93° C. As a consequence, HDPE dissolves in TCB above 110° C., LDPE above 85° C.

HDPE: The SWNTs are suspended in TCB at 0.2-0.3 mg/ml at room temperature using an ultrasonic bath for 72 hours. Then, the water temperature in the ultrasonic bath is increased to 96° C. and the sonication is continued until the TCB-SWNT solution has adapted this temperature. The HDPE is dissolved in TCB at 20 mg/ml at a temperature of 110° C. or higher. Once the HDPE is dissolved, the TCB-HDPE solution is poured into the TCB-SWNT suspension in the ultrasonic bath. The temperature of the ultrasonic bath is maintained for 5 minutes to disperse the SWNTs in the dissolved HDPE. Then, the temperature of the ultrasonic bath is lowered below 90° C. to crystallize the HDPE. After this TCB-SWNT-HDPE suspension has cooled to RT, it is filtered to obtain the composite, which is washed with acetone and dried in a vacuum oven at elevated temperature.

LDPE: The SWNTs are suspended in TCB at 0.2-0.3 mg/ml at room temperature using an ultrasonic bath for 72 hours. Then, the water temperature in the ultrasonic bath is increased to 80° C. and the sonication is continued until the TCB-SWNT solution has adapted this temperature. The LDPE is dissolved in TCB at 20 mg/ml at a temperature of 85° C. or higher. Once the LDPE is dissolved, the TCB-LDPE solution is poured into the TCB-SWNT suspension in the ultrasonic bath. The temperature of the ultrasonic bath is maintained for 5 minutes to disperse the SWNTs in the dissolved LDPE. Then, the temperature of the ultrasonic bath is lowered below 65° C. to crystallize the LDPE. After this TCB-SWNT-LDPE suspension has cooled to RT, it is filtered to obtain the composite, which is washed with acetone and dried in a vacuum oven at elevated temperature.

Results

Using the hot-coagulation method, composites from HDPE and HiPco were made with 1, 10, and 20 wt % nanotube loading. Composites from HDPE and laser SWNTs were made with 1, 10, and 30 wt % nanotube loading; composites from LDPE and laser SWNTs had nanotube loadings of 1, and 30 wt %. Composites of 1 and 30 wt % (or 10 wt %) could be made in the same manner and time, the 30 wt % composite only requiring more solvent to suspend the SWNTs at the given concentration.

Figure 10:
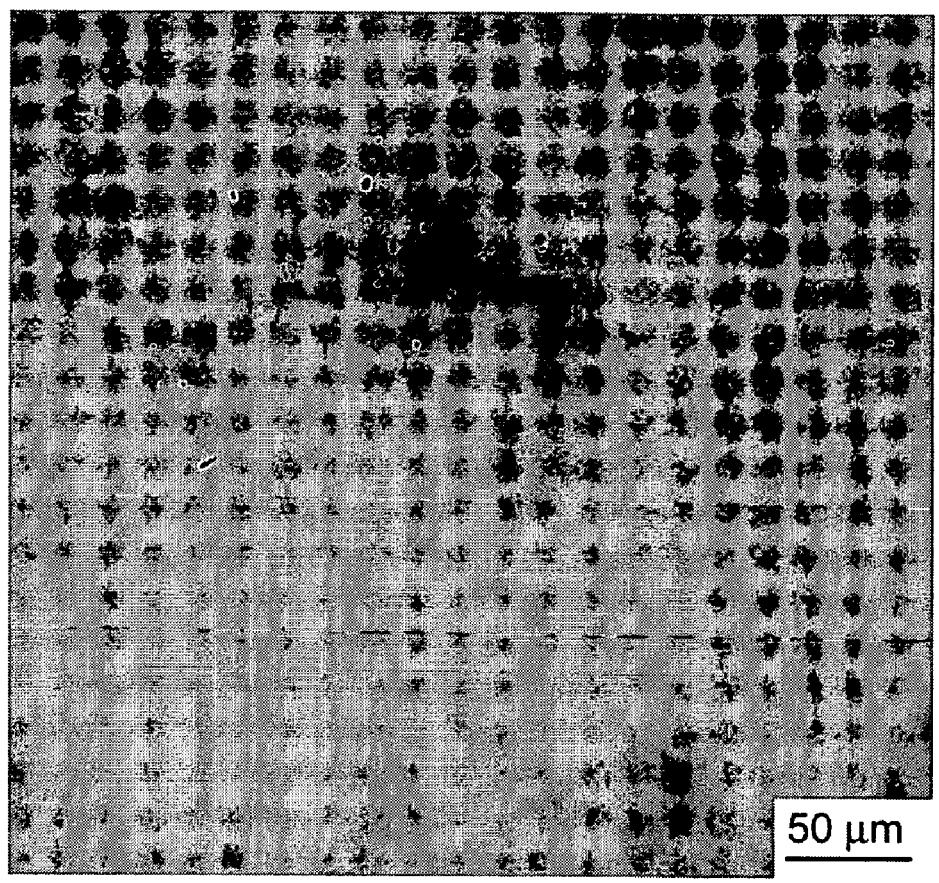
FIG. 10 is a light micrograph of laser SWNTs suspended in TCB, 0.2 mg/ml.
Figure 11:
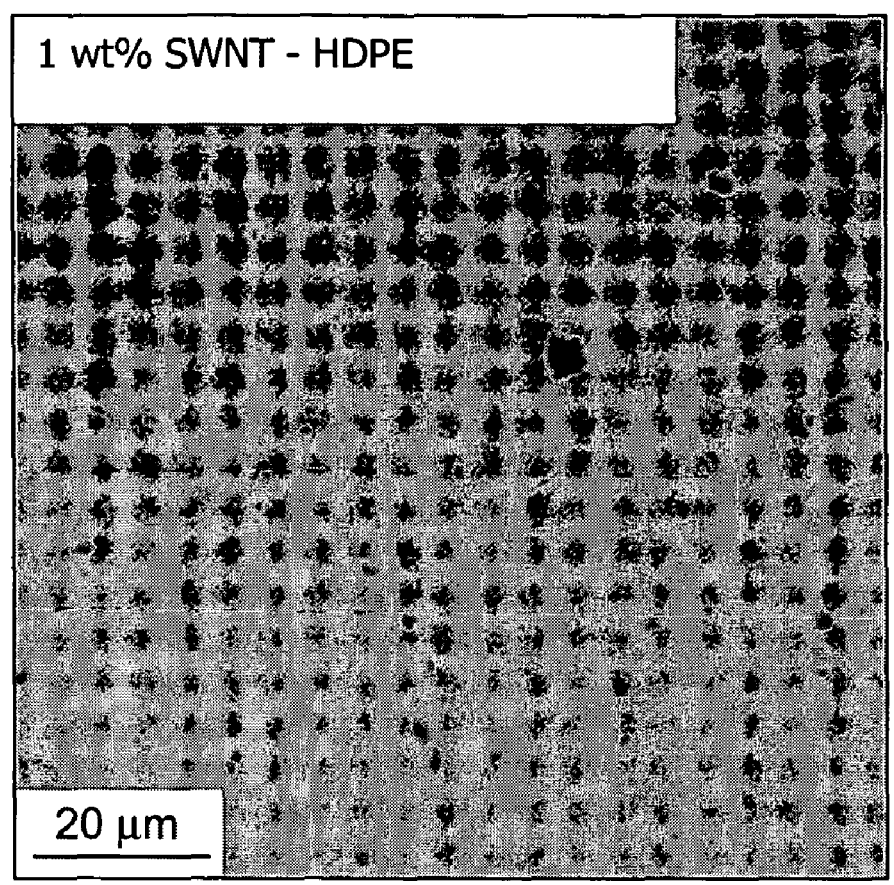
FIG. 11 is a transmission light micrograph of pressed composites film of the present invention.
Figure 12:
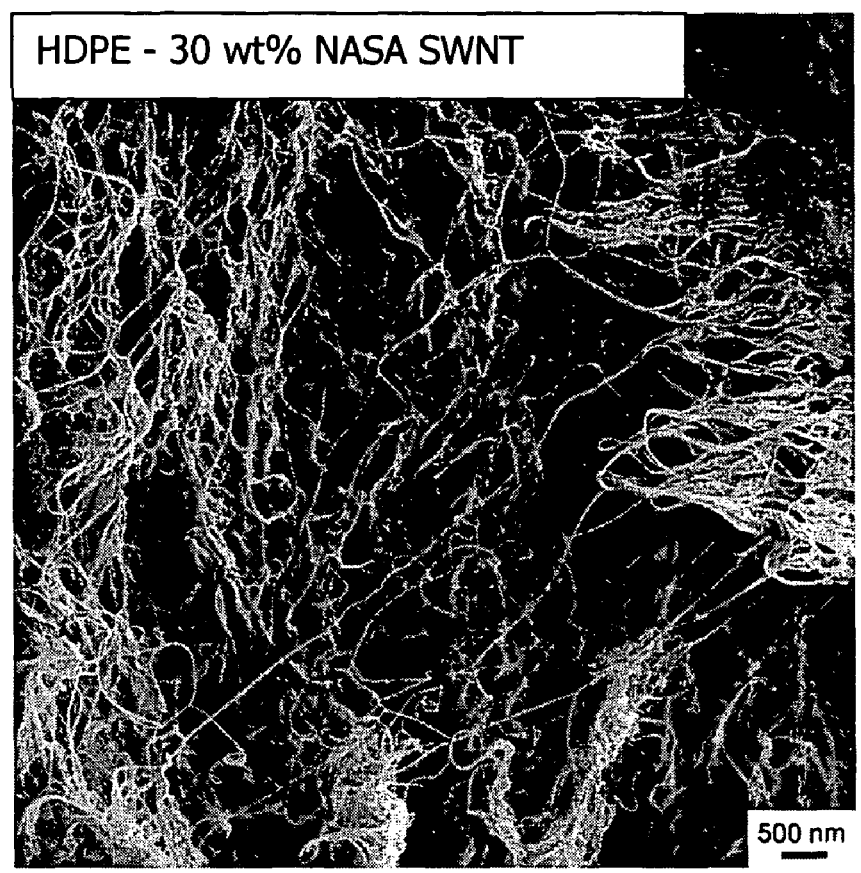
FIG. 12 is a SEM of fracture surface of a composite of the present invention.

The initial SWNT dispersion in TCB was preserved or improved in the composites. Light microscopy and atomic force microscopy showed the nanotubes dispersed in single tubes, small bundles and as well loose agglomerates and dense particles (FIG. 10). Transmission light microscopy on pressed composite films (FIG. 11) and SEM on fracture surfaces (FIG. 12) only showed dense particles and homogenous nanotube distribution, but no loose agglomerates. It seems that the agglomerates are dispersed with help of the polyethylene during the composite fabrication. The dense particles cannot be dispersed. The electrical resistivities were ~10 M$\Omega$m for the PE, ~1200 $\Omega$m for the 1 wt % composites, ~10 $\Omega$m for the 10 wt % composite, and ~6 $\Omega$for the 30 wt % composites, as determined by a two-point measurement.

Figure 13:
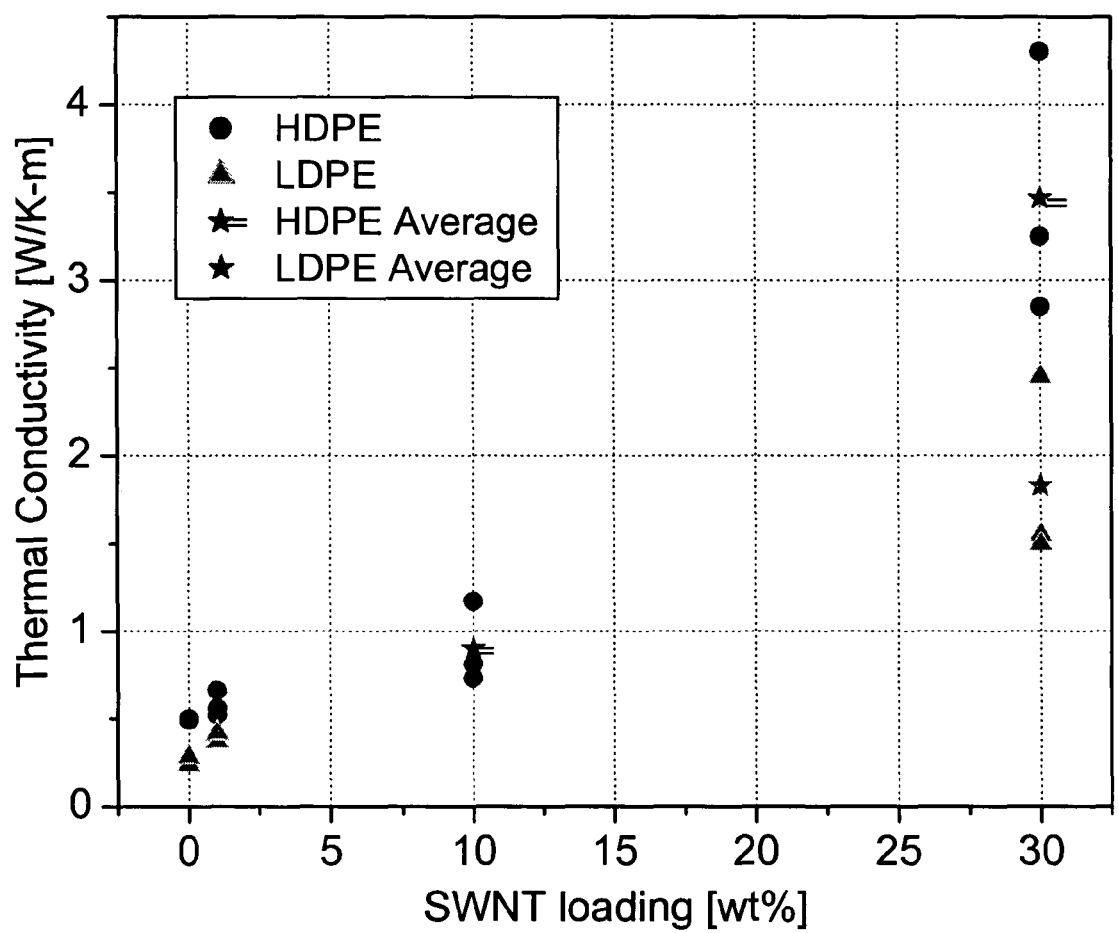
FIG. 13 compares thermal conductivity vs. SWNT loading for HDPE- and LDPE-laser SWNT composites of the present invention.

The comparative method was used to measure the thermal conductivities of the polyethylene and the composites. The thermal conductivity of HDPE and LDPE are 0.5 W/K-m and 0.26 W/K-m, respectively (FIG. 13), building the base difference for the two crystallinities. The addition of 1 wt % SWNT increases the thermal conductivity to 0.58 W/K-m for the HDPE composites and 0.40 W/K-m for the LDPE composites, reducing the difference slightly. The change in the difference is within the assumed error of 10%. At 30 wt % nanotubes, the difference in thermal conductivity of the average values increased to 1.64 W/K-m. The wider spread of the data at 30 wt % nanotube loading could be caused by small differences in orientation, reducing the magnitude of the difference somewhat. Nevertheless, the higher crystallinity seems to interact with the nanotubes in a favorable manner, increasing the thermal conductivity at higher loadings.

The disclosures of each patent, patent application, and publication cited or described in this document are hereby incorporated herein by reference, in their entireties. Each recited range includes all combinations and subcombinations of ranges, as well as specific numerals contained therein. Various modifications of the invention, in addition to those described herein, typically will be apparent to those skilled in the art from the foregoing description. Such modifications are also intended to fall within the scope of the appended claims.

What is claimed:

1. A method for producing a composition having dispersed single walled carbon nanotubes, comprising:
    contacting the single walled carbon nanotubes with a first fluid, wherein the first fluid is at least one of DMF, toluene, acetone, methanol, ethanol, methyl ethyl ketone, xylene, or water;
    combining the single walled carbon nanotubes and first fluid with a polymer that is soluble in the first fluid, wherein the polymer is at least one of poly(methyl methacrylate), poly(olefins), poly(imides), poly(amides), poly(dienes), poly(acetylenes), poly(alkenes), poly(acrylics), poly(methacrylics), poly(vinyl ethers), poly(vinyl alcohols), poly(acetals), poly(vinyl ketones), poly(vinyl halides), poly(vinyl nitriles), or poly(styrenes); and
    thereafter precipitating the polymer from the fluid, entraining the single walled carbon nanotubes with the polymer, to give rise to the composition being characterized by substantially no bundling or coagulation of the single walled carbon nanotubes, wherein the step of precipitating the polymer includes contacting the mixture of single walled carbon nanotubes, first fluid, and polymer with a second fluid, the second fluid being different from the first fluid, wherein the polymer is not soluble in the second fluid, and wherein the mixture is added dropwise into the second fluid, wherein the second fluid is at least one of DMF, toluene, acetone, methyl ethyl ketone, xylene, or water, provided that the second fluid is miscible with the first fluid.

2. The method of claim 1, wherein the first fluid is DMF.

3. The method of claim 2, wherein the polymer is poly(methyl methacrylate).

4. The method of claim 1, wherein the volume of the first fluid is in a ratio of about 1:5 with the second fluid.

5. A composition made according to the method of claim 1.

* * * * *